US 8,713,296 B2

(12) United States Patent
Iwata

(10) Patent No.: US 8,713,296 B2
(45) Date of Patent: Apr. 29, 2014

(54) APPARATUS FOR RESTORING SETTING INFORMATION OF A BOARD MANAGEMENT CONTROLLER FROM A BACKUP MEMORY BEFORE LOADING AN OS WHEN A SYSTEM BOARD IS REPLACED

(75) Inventor: Atsushi Iwata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 539 days.

(21) Appl. No.: 12/568,048

(22) Filed: Sep. 28, 2009

(65) Prior Publication Data

US 2010/0082957 A1 Apr. 1, 2010

(30) Foreign Application Priority Data

Oct. 1, 2008 (JP) ................................. 2008-256735

(51) Int. Cl.
*G06F 9/00* (2006.01)
*G06F 9/24* (2006.01)
*G06F 15/177* (2006.01)

(52) U.S. Cl.
USPC ............................................................ 713/1

(58) Field of Classification Search
USPC ............................................................ 713/1
See application file for complete search history.

(56) References Cited

U.S. PATENT DOCUMENTS

| 7,293,165 | B1 * | 11/2007 | Tobias ............................. 713/1 |
| 7,509,401 | B2 | 3/2009 | Takamoto et al. |
| 8,190,717 | B2 | 5/2012 | Takamoto et al. |
| 2006/0015656 | A1 | 1/2006 | Hayashi |
| 2006/0075217 | A1 | 4/2006 | Takamoto et al. |
| 2007/0150715 | A1 * | 6/2007 | Rothman et al. .................. 713/1 |
| 2009/0006834 | A1 * | 1/2009 | Rothman et al. .................. 713/2 |
| 2009/0113194 | A1 * | 4/2009 | Orita et al. ........................ 713/1 |
| 2009/0132799 | A1 * | 5/2009 | Brumley et al. ............. 713/100 |
| 2009/0138580 | A1 | 5/2009 | Takamoto et al. |
| 2009/0307476 | A1 * | 12/2009 | Khatri et al. ...................... 713/2 |

FOREIGN PATENT DOCUMENTS

| JP | 5-143295 A | 6/1993 |
| JP | 11-301067 A | 11/1999 |
| JP | 2000-35947 A | 2/2000 |
| JP | 2003-323299 A | 11/2003 |
| JP | 2006-031240 A | 2/2006 |
| JP | 2006-72405 A | 3/2006 |

OTHER PUBLICATIONS

Hayashi Katsutpshi, English translation of JP2006-031240.*
Yoshifumi et al., English Translation of JP2006072405, Mar. 16, 2006.*
Takayoshi, English Translation of JP05143295, Jun. 11, 1993.*
Ikuo, English Translation of JP2000035947, Feb. 2, 2000.*
Japanese Office Action mailed Aug. 21, 2012 for corresponding Japanese Application No. 2008-256735, with English-language Translation.

* cited by examiner

*Primary Examiner* — Thomas Lee
*Assistant Examiner* — Xuxing Chen
(74) *Attorney, Agent, or Firm* — Fujitsu Patent Center

(57) ABSTRACT

An information processing device includes: a processing circuit that processes information; a management circuit that is independent of the processing circuit and that performs status management of hardware including the processing circuit; and a memory into which the management circuit stores setting information of the management circuit and from which the management circuit extracts setting information of the management circuit, the memory being physically connectable to and removable from the management circuit.

8 Claims, 5 Drawing Sheets

APPARATUS FOR RESTORING SETTING INFORMATION OF A BOARD MANAGEMENT CONTROLLER FROM A BACKUP MEMORY BEFORE LOADING AN OS WHEN A SYSTEM BOARD IS REPLACED

CROSS-REFERENCE TO RELATED APPLICATION

This application is based upon and claims the benefit of priority of the prior Japanese Patent Application No. 2008-256735, filed on Oct. 1, 2008, the entire contents of which are incorporated herein by reference.

FIELD

The embodiments discussed herein are related to an information processing device.

BACKGROUND

Conventionally, an information processing device typified by a personal computer and a server, maintains setting information that is a precondition for processing in the information processing device and operates in accordance with the setting information. This enables operation of the information processing device to attune to user needs or environment of the information processing device.

As for setting information, for example, there are BIOS and firmware setting information. Such setting information is stored in CMOS (Complementary Metal Oxide Semiconductor) on a system board. The setting information is not limited to unchanged information but also includes information that changes in response to operational circumstances of the information processing device.

The setting information stored on the system board may need to be read from the CMOS and saved in an external device, if a failure occurs and the system board needs to be replaced. After replacing the system board, the setting information needs to be written back on the system board.

Conventionally, if a failure occurs, an operating system (OS) used for recovery is started up from a flexible disk (FD) or the like to read and save setting information under the recovery OS. After the system board is replaced, the setting information is written again under the recovery OS.

Hereafter, a conventional recovery procedure will be explained.

After confirming that a system board needs to be replaced by a test program or the like, firstly, a FD or the like that stores a recovery OS is inserted in an information processing device and the recovery OS is started. Then, under the recovery OS, setting information stored on CMOS on the system board is read and saved in the FD or the like.

Next, power of the information processing device is shut down and the system board is replaced.

After replacing the system board, the recovery OS is started once more and the setting information saved in the FD or the like is read under the recovery OS and stored in CMOS on a new system board.

Then, an original OS is started and the recovery is confirmed by running a test program.

Such a recovery procedure enables the information processing device to be restored to its original state including the setting information.

However, if such a failure that disables starting of OS occurs in an information processing device, reading operation like this becomes impossible.

To avoid this, as a conceivable method of recovering a system completely, a backup of the setting information is prepared before a failure occurs, and if a failure occurs, the setting information is restored from the backup after a system board is replaced so far as to enable the recovery OS to start.

Traditionally, various techniques have been known as a technique of backing up information in an information processing device. One known technique prepares a drive and a medium dedicated solely to backup firmware data of a printer to save information in the medium (see Japanese Laid-open Patent Publication No. 11-301067, for example). Another known technique saves setting information in a CF card built in an information processing device (see Japanese Laid-open Patent Publication No. 2006-31240, for example).

SUMMARY

According to an aspect of the invention, an information processing device includes:

a processing circuit that processes information;

a management circuit that is independent of the processing circuit and that performs status management of hardware including the processing circuit; and a memory into which the management circuit stores setting information of the management circuit and from which the management circuit extracts setting information of the management circuit, the memory being physically connectable to and removable from the management circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of an information processing device will be explained with reference to drawings.

Figure 1:
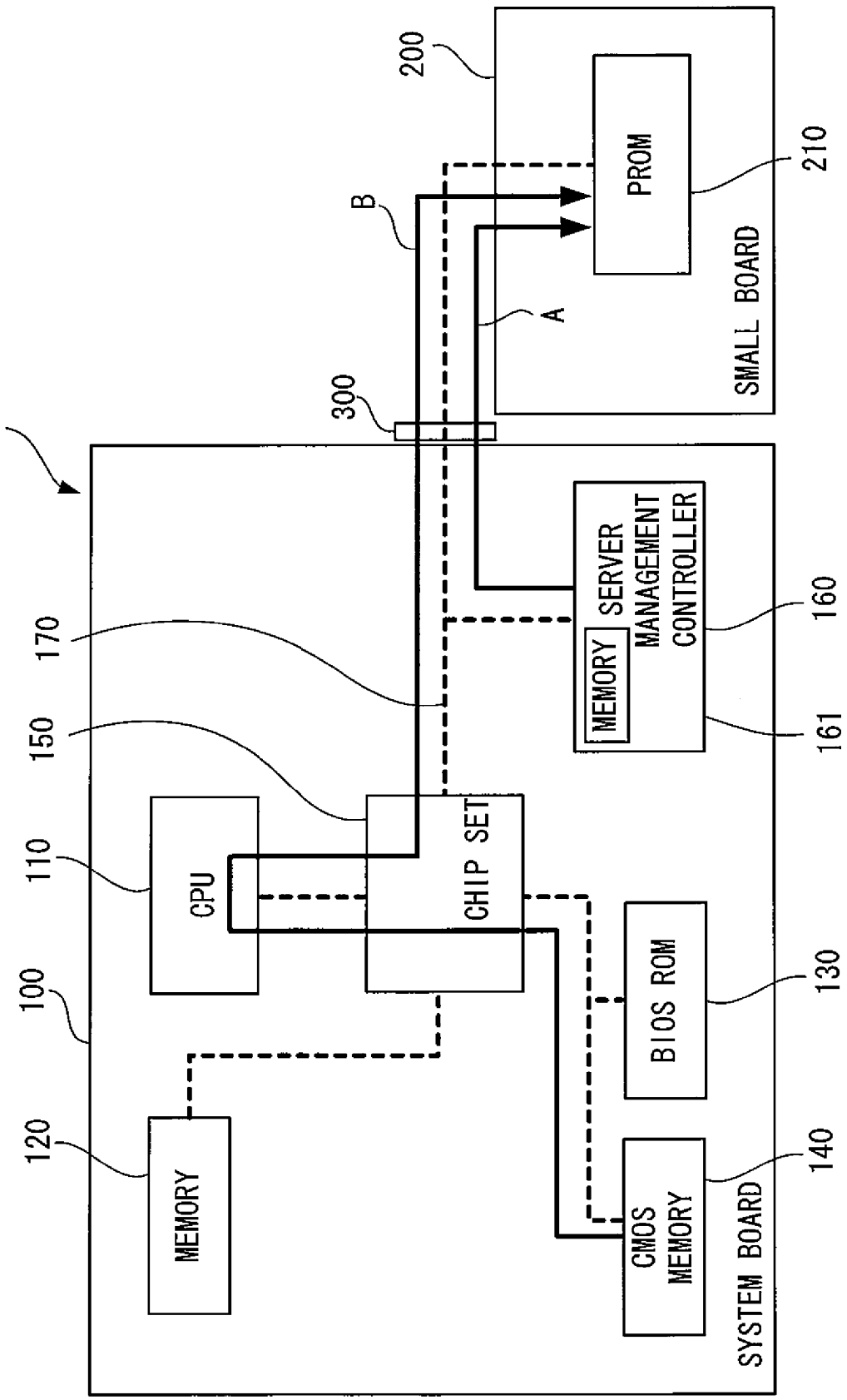
FIG. 1 is a diagram of a server.

FIG. 1 is a diagram of a server that is an embodiment of the information processing device.

This diagram illustrates only elements related to a system board of a server 10. The illustration of a power section, a hard disk drive, and interface that are generally included in a conventional server is omitted.

The server 10 is equipped with a system board 100 and a small board 200. The system board 100 and the small board 200 are connected via a connector 300, thereby allowing physical connection and detachment of the boards freely.

On the system board 100, a CPU 110, a memory 120, a BIOSROM 130, a CMOS memory 140 and a chip set 150 are mounted. The CPU 110 performs information processing as OS and BIOS, thereby performing information processing intended for external use that is required, for example, when the server 10 functions as a Web server, as well as information processing intended for internal use that is required for controlling operation of a hard disk or interface incorporated in the server 10. The memory 120 is used as working areas or the like in information processing performed by the CPU 110. The BIOSROM 130 stores the BIOS. The CMOS memory 140 stores setting information necessary for running the BIOS. The chip set 150 is connected to each of the elements mounted on the system board 100 and passes data between the elements. The CPU 110 exemplifies the processing circuit in the information processing device.

Recently, in general, status management of hardware in a server, such as temperature control and power control in the server is performed by a dedicated controller. On the system board 100, a board management controller (BMC) 160 serving as such a controller is mounted. The BMC 160 is also connected to the chip set 150 via a system bus 170. The BMC 160 exemplifies the management circuit in the information processing device.

The BMC 160 includes an internal memory 161, and the internal memory 161 stores setting information used for management by the BMC 160. Although not illustrated in particular, the BMC 160 may be directly accessed through the LAN from the outside of the server 10 (i.e., without going through an operation of the CPU 110). The BMC 160 continues operating in such a case where the CPU 110 is not operated when the server 10 is put in a standby state or the like. The BMC 160 may also be called server management processor or the like by being named after its role.

On the other hand, on the small board 200, a PROM (specifically, a flash memory) 210 is mounted. The PROM 210 is connected to the system bus 170 on the system board 100 via the connector 300, and thus directly connected to the BMC 160 via the system bus 170 without passing through the chip set 150. The PROM 210 exemplifies the memory in the information processing device.

Figure 2:
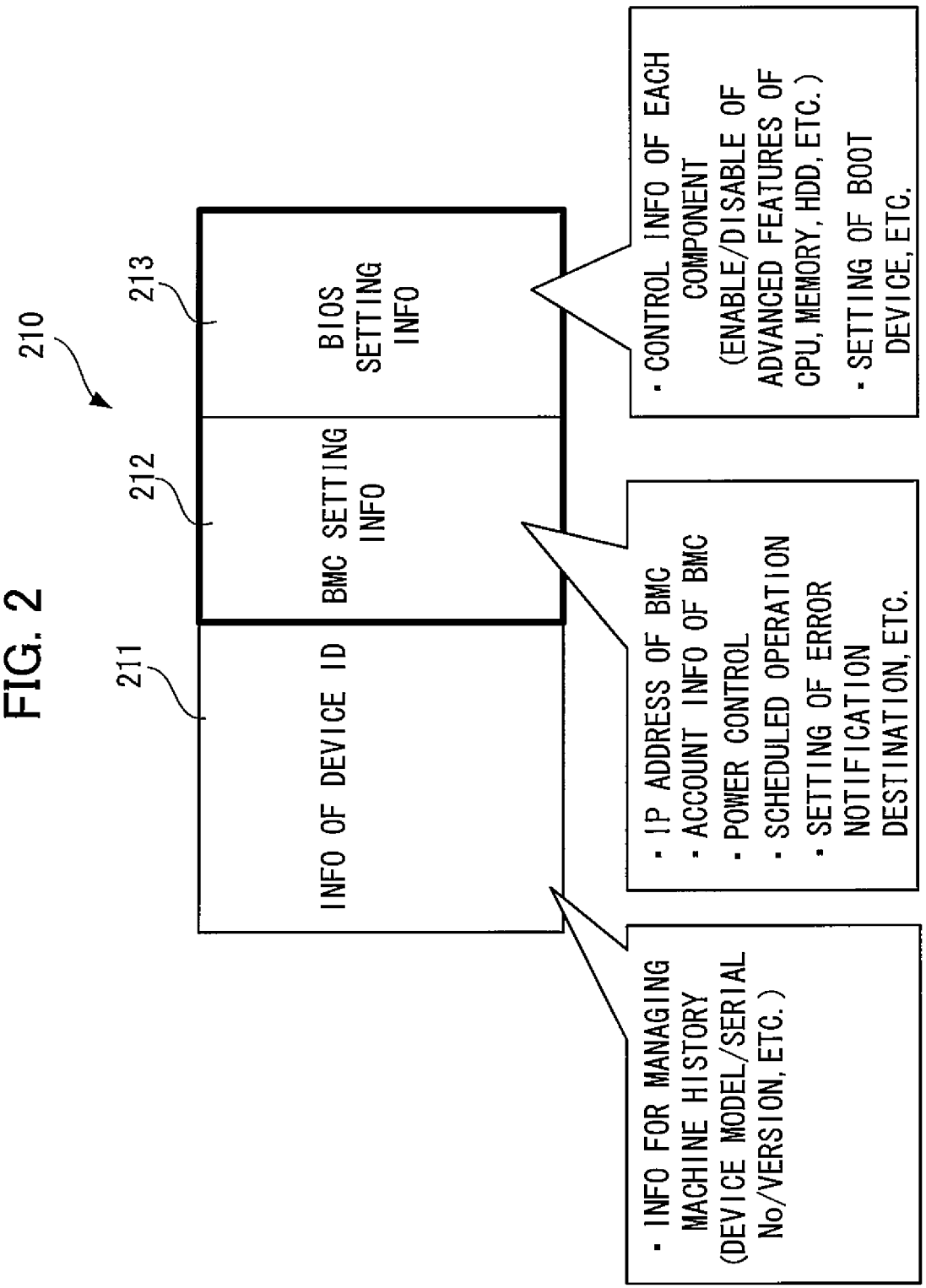
FIG. 2 is a diagram illustrating information stored in PROM on a small board.

FIG. 2 is a diagram illustrating information stored in the PROM 210 on the small board 200.

In the PROM 210 on the small board 200, device ID information 211, setting information 212 of the BMC 160 and setting information 213 of the BIOS are stored.

The device ID information 211 is information that is unique to the server 10 in FIG. 1, and specifically, the device ID information 211 includes identification information, a serial number or a version number of a device for identifying a device model. The device ID information 211 is mainly used for managing machine history of the server 10.

The setting information 212 of the BMC 160 is a backup of setting information stored in the internal memory 161 of the BMC 160 and directly stored in the internal memory 161 by the BMC 160 via the system bus 170 (See an arrow A of FIG. 1). Specifically, the setting information 212 of the BMC includes IP address and account information for accessing the BMC 160 through the LAN, setting information for power control, scheduling information for scheduled operation, setting information of notification address when an error occurs, etc. The storage of the setting information 212 of the BMC 160 is performed when setting information stored in the internal memory 161 is changed, and also performed even while the server 10 is in the standby state. That is, the embodiment described here corresponds to an embodiment of the information processing device as well as corresponds to an embodiment of an additional feature that "the management circuit operates to perform the status management even when the processing circuit is not started up, and stores setting information in the memory even when the processing circuit is not started up". According to this additional feature, the setting information in lower hierarchy can be appropriately backed up independently of the operation of higher hierarchy, thereby, even in such a case where the higher hierarchy is inoperable, the setting information can be protected.

The BIOS setting information 213 includes control information (for example, enable and disable setting of functions) of various kinds of components (e.g., hardware components included in the server 10), such as the CPU 110, the memory 120 and the hard disk drive (not illustrated), and setting of a boot device. The BIOS setting information 213 is a backup of information stored in the CMOS memory 140 in FIG. 1, which is to be stored via the chip set 150 and the system bus 170 under the CPU 110 controlled by the BIOS memory 140 (See an arrow B of FIG. 1) as will be described later. To enable such storage, an improved BIOS program is stored in the BIOSROM 130 in FIG. 1.

Hereafter, operations of storing the BIOS setting information 213 in the PROM 210 will be explained in detail.

Figure 3:
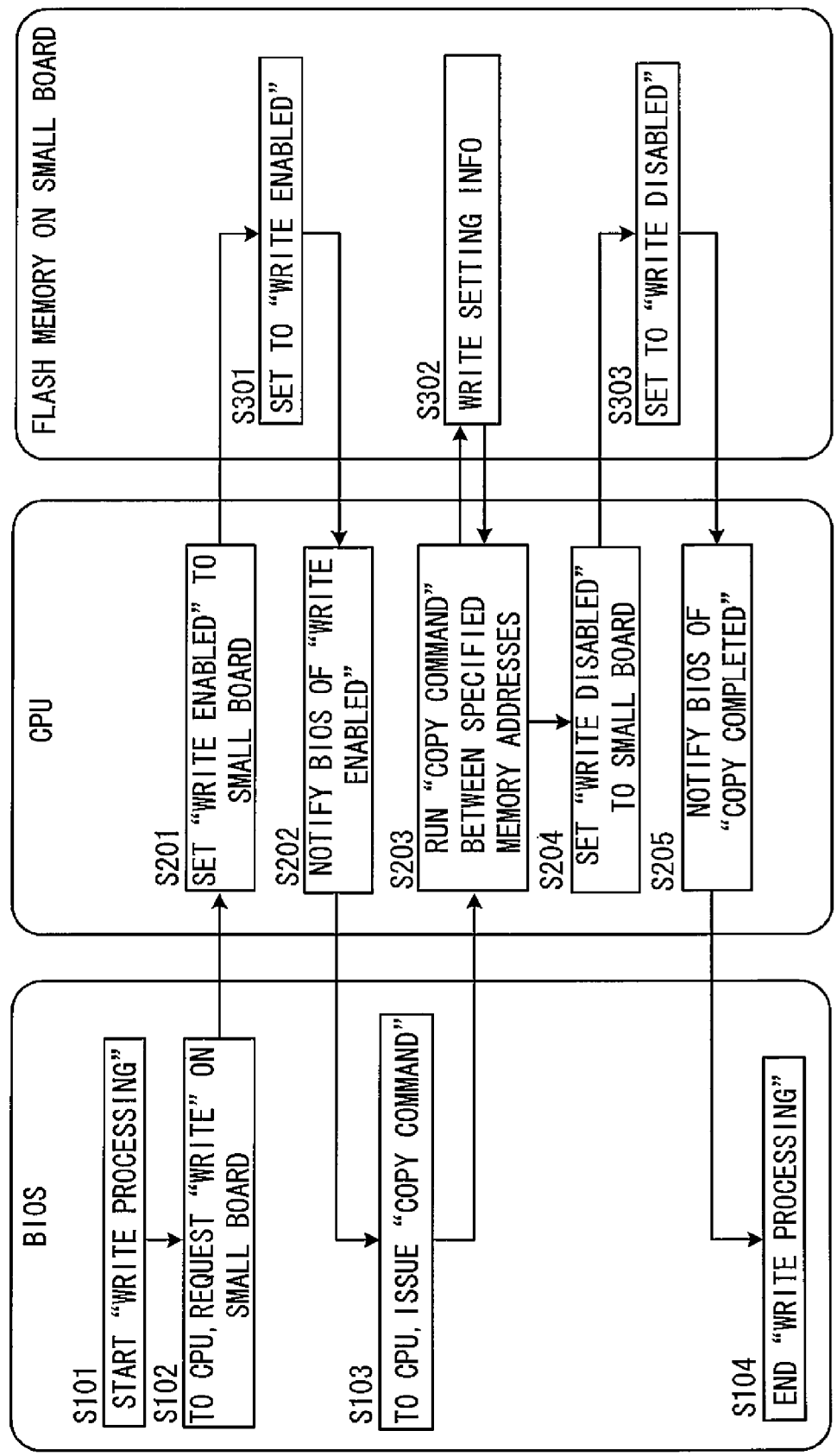
FIG. 3 is a diagram illustrating operations of storing BIOS setting information in PROM.

FIG. 3 is a diagram illustrating operations of storing BIOS setting information in the PROM 210. In the following explanation of FIG. 3, the elements in FIG. 1 will be referred to without specifically mentioning the figure number.

In FIG. 3, operations on the BIOS program, operations run by the CPU 110 and operations of the PROM 210 (in this case, a flash memory) on the small board 200 are illustrated.

When BIOS setting information is changed, "write processing" for writing data from the CMOS memory 140 to the PROM 210 is started on the BIOS (step S101). A request to "write" data into the PROM 210 on the small board 200 is sent to the CPU 110 from the BIOS (step S102). Upon receipt of this request from the BIOS, the CPU 110 sets "write enabled" to the PROM 210 on the small board 200 (step S201), thereby the PROM 210 is brought into a state of "write enabled" (step S301) to allow information to be written therein.

If the PROM 210 is brought into the state of "write enabled", the CPU 110 notifies the BIOS of "write enabled" (step S202), and the BIOS having received the notice issues "copy command" to the CPU 110 to request copying (step S103). In the "copy command", a copy source and a copy destination are specified by address respectively. The BIOS specifies an address on the CMOS memory 140 as the copy source and an address on the PROM 210 address as the copy destination.

The CPU 110 having received "copy command" performs information copying between the specified addresses (step S203), thereby setting information copied from the CMOS memory 140 is written to the PROM 210 (step S302).

After running such "copy command", the CPU 110 sets "write disabled" to the PROM 210 (step S204), thereby the PROM 210 is brought into a state of "write disabled" (step S303) in which writing of information is prohibited.

When the PROM 210 is brought into the state of "write disabled", the CPU 110 notifies the BIOS that the "copy command" is completed (step S205), and the BIOS having received the notice ends "write processing" (step S104).

As explained above, the BMC setting information 212 and the BIOS setting information 213 illustrated in FIG. 2 are updated appropriately by the BMC 160 and the BIOS. That is, the embodiment explained here also corresponds to an additional feature that "the setting information of the management circuit is stored into and extracted from the memory by the management circuit, and setting information relating to information processing in the processing circuit is stored into and extracted from the memory by the processing circuit". This additional feature is preferable, since this additional feature enables backup of the setting information of the processing circuit together with the setting information of the management circuit. In addition, as illustrated in FIG. 2, since the device ID information 211 is also stored in the PROM 210, the embodiment explained here also corresponds to an additional feature that "the memory is also used as an ID memory that stores information unique to the information processing device". According to this additional feature, by using the memory also as the ID memory, unnecessary increase in cost may be avoided.

Here, supposing that a trouble occurs in the system board 100 of the server 10 in FIG. 1 and a replacement thereof is required. If the system board 100 is replaced, setting information stored on the system board 100, i.e., the setting information stored in the CMOS memory 140 and the setting information stored in the internal memory 161 of the BMC 160 are lost. Therefore, in order to restore the server 10 to a state before the trouble occurs, the setting information may need to be restored as well. Hereafter, explanation will be made about this recovery work.

Figure 4:
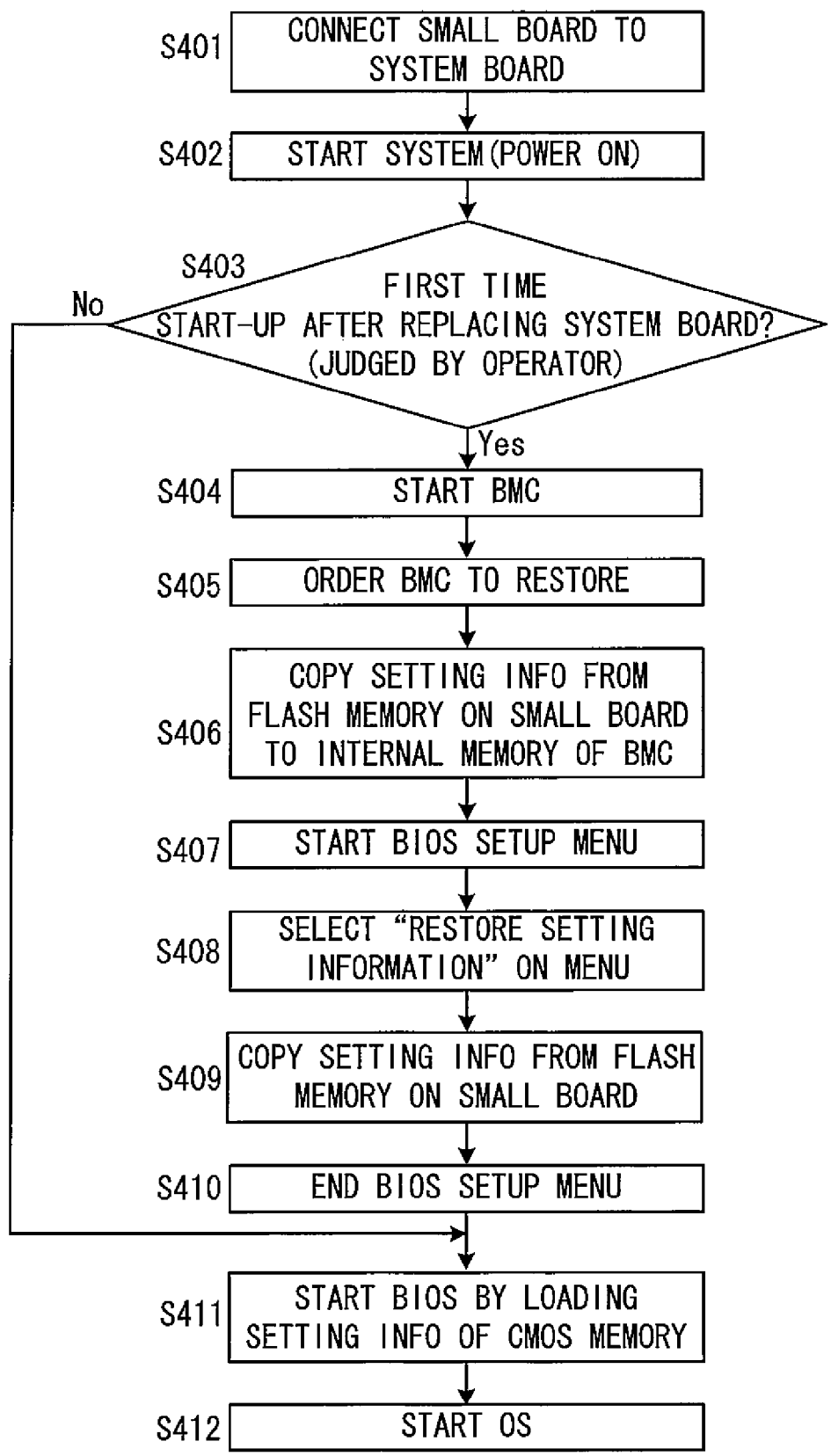
FIG. 4 is a flowchart illustrating a recovery procedure of a server.

FIG. 4 is a flowchart illustrating a recovery work of the server. In the following explanation of the flowchart, the elements in FIG. 1 may be referred to without specifically mentioning the figure number.

If it is confirmed by a test program or the like that the system board 100 needs to be replaced, for example, the system board 100 and the small board 200 are separated at the connector 300, and the system board 100 is replaced while leaving the small board 200. Then, the small board 200 is connected to the newly replaced system board 100 via the connector 300 (step S401).

Subsequent to the replacement of the system board 100 and the connection to the small board 200, a system of the server 10 is started (step S402). However, in this step, only the power of the server 10 is turned on, whereas the BMC 160, the BIOS, and the OS are not started.

Next, if the system board 100 is started up for the first time after the replacement of the system board 100 (step S403; Yes), an operator starts the BMC 160 (step S404) and orders restoration of the setting information to the BMC 160 through the LAN (step S405). The BMC 160 having received the order reads the BMC setting information from the PROM 210 on the small board 200 and copies to the internal memory 161 (step S406).

Then, the operator starts BIOS setup menu (step S407) and selects "Restore setting information" on the menu (step S408).

When "Restore setting information" is selected, the BIOS setting information is read from the PROM 210 on the small board 200 under the CPU 110 controlled by the BIOS, and copied to the CMOS memory 140 (step S409).

Here, operations of "Restore setting information" will be described in detail.

Figure 5:
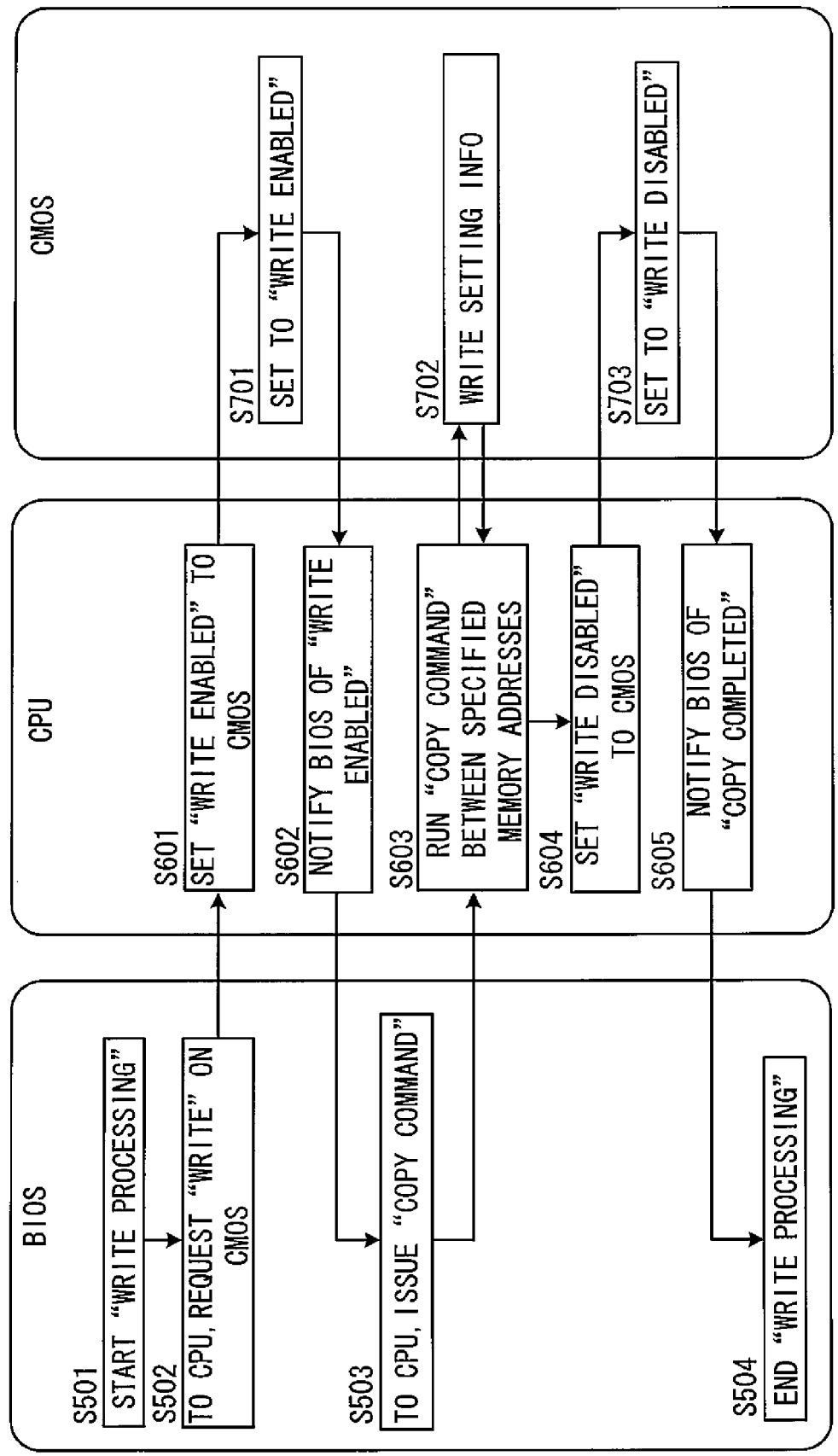
FIG. 5 is a diagram illustrating operations of "Restore setting information".

FIG. 5 is a diagram illustrating operations of "Restore setting information". Also in the explanation of FIG. 5, the elements in FIG. 1 will be referred to without specifically mentioning the figure number.

In FIG. 5, operations on the BIOS program, operations run by the CPU 110 and operations of the CMOS memory 140 are illustrated.

If the "Restore setting information" is selected on the BIOS setup menu, "write processing" from the PROM 210 to the CMOS memory 140 is started on the BIOS (step S501), and "write" to the CMOS memory 140 is requested to the CPU 110 (step S502). Upon receipt of the "write" request from the BIOS, the CPU 110 sets "write enabled" to the CMOS memory 140 (step S601), thereby the CMOS memory 140 is brought into the state of "write enabled" (step S701) to allow information written therein.

When the state of the CMOS memory 140 is brought into the state of "write enabled", the CPU 110 notifies the BIOS of "write enabled" (step S602), and the BIOS having received the notice issues "copy command" to the CPU 110 to request copying (step S503). Here, the BIOS specifies address on the PROM 210 as a copy source, and an address on the CMOS memory 140 as a copy destination.

The CPU 110 having received "copy command" performs information copying between the specified addresses (step S603), thereby setting information copied from the PROM 210 is written to the CMOS memory 140 (step S702).

After running such "copy command", the CPU 110 sets "write disabled" to the CMOS memory 140 (step S604), and the CMOS memory 140 is brought into the state of "write disabled" (step S703) in which writing of information is prohibited.

When the CMOS memory 140 is brought into the state of "write disabled", the CPU 110 notifies the BIOS that the "copy command" is completed (step S605), and the BIOS having received the notice ends "write processing" (step S504).

By these operations, if the BIOS setting information is restored in step S409 of FIG. 4, the operator ends the BIOS setup menu (step S410) and starts the BIOS normally. The BIOS loads the setting information stored in the CMOS memory 140 and starts up (step S411). Then, OS starts up based on the BIOS control (step S412). With this, the system of the server 10 is restored.

Incidentally, in step S403, if it is not the first time to start-up the system board 100 (step S403; No), the operator starts the BMC 160 and the BIOS normally. The BIOS loads the setting information stored in the CMOS memory 140 and starts up (step S411), and then the OS starts up based on the BIOS control (step S412).

In the recovery work illustrated in FIG. 4, the setting information of the BMC 160 is restored while the OS and the BIOS are not started. And the BIOS setting information is restored while the OS is not started. That is, the embodiment explained here corresponds to an additional feature that "the management circuit operates to perform the status management even when the processing circuit is not started up, and extracts setting information stored in the memory before the processing circuit is started up". According to this additional feature, the setting information is extracted before the management circuit is started up, therefore, it is possible to start the higher hierarchy supported by the processing circuit safely, after the setting information in lower hierarchy is properly extracted.

Additionally, although a server is exemplified in the embodiments, the information processing device may be applied to a personal computer or the like, other than the server.

Furthermore, in the embodiments, a memory that stores both device ID and BIOS setting information is used as an example of the memory in the information processing device. However, a memory that stores only setting information of the management circuit may be used as another example of the memory in the information processing device.

As described above, according to the information processing device, it is possible to restore setting information in lower hierarchy even if higher hierarchy is not in operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. An information processing device, comprising:
   a processing circuit that processes information by using an operating system (OS);
   a management circuit that is independent of the processing circuit, performs status management of hardware including the processing circuit, and includes a management memory in which setting information of the management circuit is stored; and
   a backup memory into which setting information of the management circuit stored in the management memory is copied as management backup information by the management circuit and from which the management backup information is extracted by the management circuit, the backup memory being physically connectable to and removable from the management circuit, wherein
   the management circuit operates to perform the status management even when the processing circuit is not started up, and copies the setting information of the management circuit stored in the management memory as the management backup information in the backup memory even when the setting information stored in the management memory is changed while the processing circuit is not started up, and
   the management circuit reads the setting information from the backup memory to restore the setting information in the management memory and then the processing circuit starts the operating system (OS).

2. The information processing device according to claim 1, further comprising a processing memory into which setting information relating to processing information in the processing circuit is stored, wherein
   the setting information of the management circuit stored in the management memory is copied into the backup memory as the management backup information by the management circuit, and the setting information stored in the processing memory is copied as processing backup information by the processing circuit, and the processing backup information is extracted by the processing circuit.

3. The information processing device according to claim 1, wherein the management circuit operates to perform the status management even when the processing circuit is not started up, and extracts the management backup information from the backup memory before the processing circuit is started up.

4. The information processing device according to claim 1, wherein the backup memory is also used as an ID memory that stores information unique to the information processing device.

5. The information processing device according to claim 1, wherein
   BIOS setting information is also stored in the backup memory, and
   the BIOS setting information is written into a memory of a BIOS before the operating system is started.

6. The information processing device according to claim 5, wherein
   the processing circuit enables the memory of the BIOS to be set to be writable; and
   the setting information of the BIOS in the backup memory is written into the memory set to be writable.

7. The information processing device according to claim 5, wherein the setting information of the BIOS in the backup memory is written into the memory of the BIOS after the setting information is restored in the management memory by the management circuit.

8. The information processing device according to claim 5, wherein the management circuit restores the setting information in the management memory according to an instruction via a local area network (LAN).

* * * * *